United States Patent Office 2,959,064
Patented Nov. 8, 1960

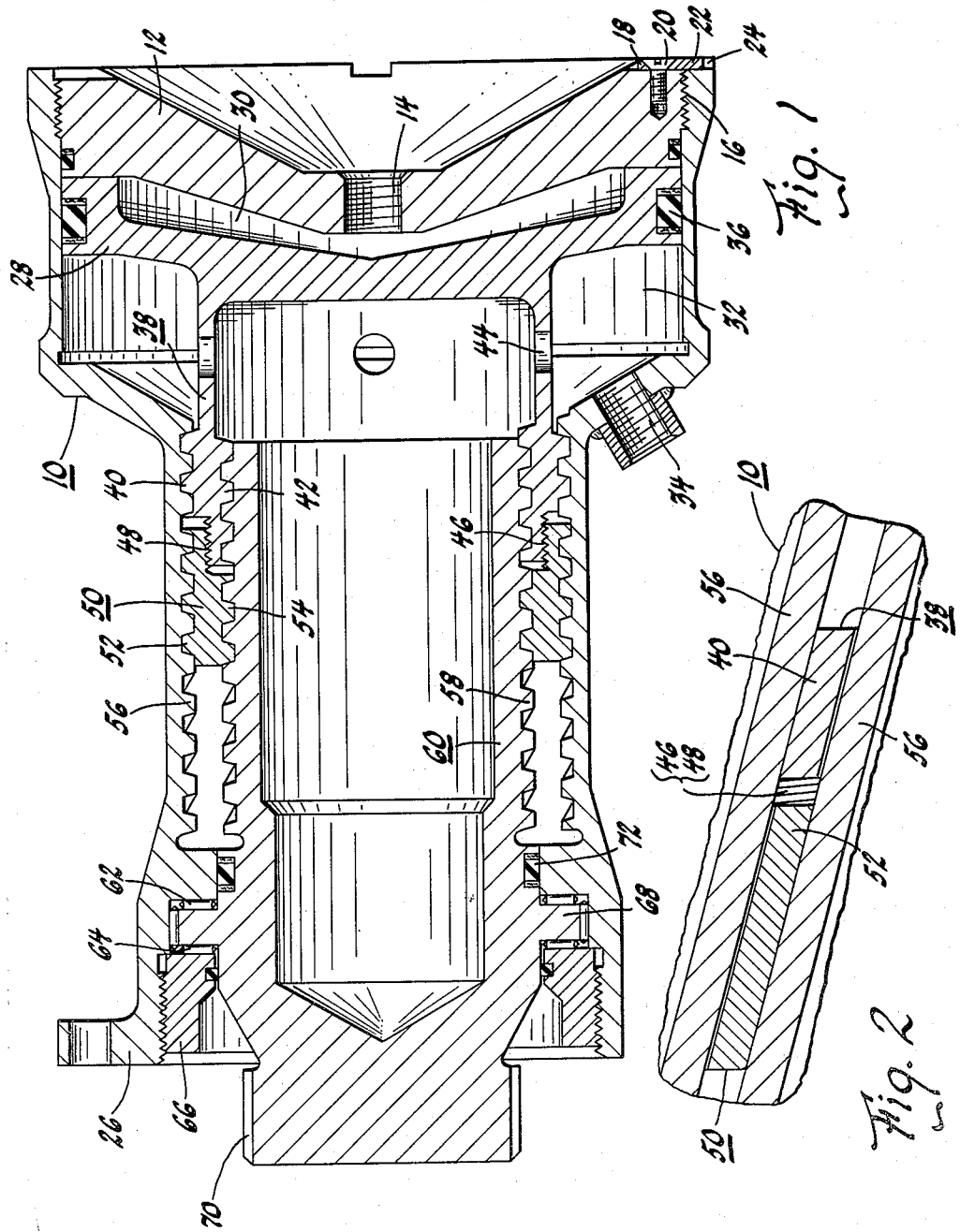

2,959,064

ROTARY ACTUATOR

Howard M. Geyer and Robert C. Helke, Dayton, Ohio, assignors to General Motors Corporation, Detroit, Mich., a corporation of Delaware Filed Apr. 11, 1958, Ser. No. 727,924

9 Claims. (Cl. 74—441)

This invention pertains to rotary actuators, and particularly to rotary actuators with adjustable anti-backlash means.

It is well recognized that it is impractical to manufacture mating helically splined parts within the close tolerances required to eliminate backlash therebetween. Accordingly, in order to eliminate the backlash inherent between mating helically splined parts it has been proposed to separate one of the helically splined parts into two sections and insert shims between the two sections to misalign the spline teeth to eliminate backlash. An actuator including this type of anti-backlash means is disclosed in Patent #2,791,128.

However, the practice of interposing shims between two sections of a splined member is time consuming, and thus increases the expense of manufacturing rotary actuators since in order to adjust the misalignment between the helical spline teeth of the two sections, the two sections must be disconnected, a shim removed or inserted, and then the two sections must be reassembled. The present invention relates to readily adjustable means for misaligning the spline teeth of two sections of a splined member so as to eliminate backlash. Accordingly, among our objects are the provision of a rotary actuator including means for eliminating backlash between relatively rotatable parts having helical splined teeth, the further provision of a two-part helically splined member having parts which are adjustable relative to each other to misalign the spline teeth thereof; and the still further provision of a two-part helically splined member having parts which are interconnected by screw threads.

The aforementioned and other objects are accomplished in the present invention by having a threaded connection between two parts of a helically splined member, the helix angle of the threads being different than the helix angle of the splines. Specifically, the actuator embodying the helical spline arrangement of this invention comprises a cylinder having disposed therein a reciprocable piston capable of fluid pressure actuation in both directions. The piston has an internal axially extending skirt with internal and external helical splines and an externally threaded portion. The threaded portion of the piston skirt receives an annulus having internal and external helical spline teeth and an internally threaded portion. Accordingly, the piston skirt and splined annulus are rotatable relative to each other so as to misalign the spline teeth thereon.

The external misaligned splines of the piston skirt assembly engage internal helical splines formed on a portion of the inner wall of the cylinder, and the internal misaligned helical splines on the skirt assembly engage helical splines formed on a member rotatably journalled in the cylinder and constituting the output member. The piston divides the cylinder into two chambers connected with ports so that fluid under pressure may be admitted to or drained from either chamber so as to effect piston reciprocation. The cylinder is designed for attachment to a fixed support so that upon reciprocable movement of the piston, the piston has imparted thereto a slight angular movement due to the helical splined connection between the skirt assembly and the cylinder walls. The angular movement of the piston is imparted to the rotary output member through the internal helical splines on the piston skirt assembly so that the output member has imparted thereto rotation equal to the sum of the rotary movement produced by the helically splined surfaces of the cylinder, the piston skirt and the output member.

Further objects and advantages of the present invention will be apparent from the following description, reference being had to the accompanying drawing, wherein a preferred embodiment of the present invention is clearly shown.

In the drawing:

Figure 1 is a longitudinal sectional view of an actuator constructed according to the present invention.

Figure 2 is an enlarged fragmentary view, partly in section and partly in elevation, depicting the manner in which backlash between the helically splined members is eliminated.

With particular reference to Figure 1, an actuator is shown including a cylinder 10, one end of which is closed by a head cap member 12 having an extend port 14. The head cap 12 threadedly engages the cylinder 10 as indicated by numeral 16, and after assembly with the cylinder is restrained against rotation by a ring 18 secured to the cylinder head 12 by screws 20 and having radial tangs 22 aligned with notches 24 in the cylinder. The cylinder 10 is formed with an integral mounting portion 26 by which it can be attached to a suitable fixed support, not shown. Thus, the cylinder constitutes a fixed reaction member since it is restrained against all movement, both linear and rotary.

The cylinder 10 has disposed therein a reciprocable piston 28 capable of fluid pressure actuation in both directions. The piston 28 divides the cylinder 10 into an extend chamber 30 and a retract chamber 32. The retract chamber 32 communicates with a retract port 34 formed in the cylinder 10. The piston 28 carries suitable sealing means 36 which engage the internal wall of the cylinder 10 and is formed with an integral axially extending annular skirt 38 having external helical spline teeth 40 and internal helical spline teeth 42. In addition, the skirt 38 is formed with a plurality of openings 44 so that the area of the piston 28 exposed to the retract chamber 32 is equal to the area of the piston exposed to the extend chember 30. In addition, the annular skirt 38 is formed with a reduced diameter threaded portion 46, which threaded portion receives a complementary threaded portion 48 formed on an annulus 50. The annulus, or element, 50 likewise has external helical spline teeth 52 and internal helical spline teeth 54 with the same helix angle as the spline teeth 40 and 42. The threaded connection indicated by the numerals 46 and 48 between the annulus 50 and the skirt 38 constitutes adjustable means for misaligning the spline teeth of the annulus 50 and the spline teeth of the skirt 38.

The cylinder 10 is formed with internal helical spline teeth 56 which mate with the external helical spline teeth 40 and 52 of the skirt assembly. The internal helical spline teeth 42 and 54 of the skirt assembly engage external helical spline teeth 58 formed on a rotary output member 60. The rotary output member 60 is journalled in the cylinder 10 by needle bearing assemblies 62 and 64, and is restrained against axial movement by a nut 66 which threadedly engages a cylinder and maintains the needle bearings 62 and 64 in assembled relation with the cylinder 10 and a shoulder 68 of the rotary output member 60. The rotary output member extends outside the cylinder, and as shown, has an external straight spline surface 70 by which it can be connected to any suitable load device, not shown. Suitable sealing means 72 are interposed between the rotary output member 60 and the cylinder 10 to prevent the leakage of fluid from the retract chamber 30.

With particular reference to Figure 2, the helix angle of the spline teeth may be on the order of 30°, while the helix angle of the threads 46 and 48 is substantially less than 30°. The helical spline teeth 40 and 52 of the skirt assembly are misaligned as shown in Figure 2 to eliminate backlash. The spline teeth 40 and 52 are held in axially spaced relationship by the threaded interconnection between the skirt 38 and the annulus 50. Thus, the spline teeth 40 and 52 are snugly received within the grooves between the helical spline teeth 56 formed on the internal cylinder periphery. In the same manner, the spline teeth 42 and 54 are snugly received within the grooves between the helical spline teeth 58 formed on the rotary output member 60.

In order to adjust the relative positions of the elements 38 and 50 which constitute the skirt assembly, to reduce the backlash to a minimum, during assembly, the piston assembly including the piston 28, the skirt 38 and the annulus 50 is removed from the cylinder 10. The annulus 50 is rotated relative to the skirt 38 to misalign the spline teeth and the piston assembly is then inserted into the cylinder. The operator can feel the presence of any backlash, and if backlash exists, the piston assembly is again removed from the cylinder and the annulus is rotated relative to the skirt 38 after which the piston assembly is reassembled with the cylinder and the output member 60. When a position of the annulus 50 relative to the skirt 38 is found in which the backlash is substantially eliminated, the piston head 12 is assembled with the cylinder.

By reason of the different helix angles between the threads 46 and 48 and the spline teeth, the annulus 50 cannot rotate relative to the skirt 38 after it is assembled with the cylinder 10 and the rotary output member 60. That is, since the internal helical spline teeth 54 of the annulus 50 and the internal helical spline teeth 42 of the skirt 38 engage helical spline teeth 58 of the rotary output member 60, and the external helical spline teeth 52 of the annulus 50 and the external helical spline teeth 40 of the skirt 38 engage helical spline teeth 56 of the cylinder 10, relative rotation between the annulus 50 and the skirt 38 is precluded due to the locking action of the aforesaid internal and external helical spline connections. Accordingly, once the backlash between the helical spline members has been eliminated by adjustment of the annulus 50, the relative positions of the annulus 50 and the skirt 38 will remain fixed until the piston assembly is withdrawn from the cylinder.

Operation of the actuator disclosed herein is believed to be readily apparent. Upon application of fluid under pressure to the extend chamber 30, while the retract chamber 32 is connected to drain, the piston 28 will move to the left as viewed in Figure 1. Linear movement of the piston 28 to the left is accompanied by a slight rotary movement thereof due to the interconnection of the helical splines on the skirt assembly with the cylinder walls. The rotary movement of the piston 28 will be imparted to the output member 60 through the helical spline connection therebetween, and the output member will be rotated throughout a distance equal to the sum of the rotation caused by spline teeth 56 and 52, 40 and spline teeth 42, 54, and 58.

While the embodiment of the invention as herein disclosed constitutes a preferred form, it is to be understood that other forms might be adopted.

What is claimed is as follows:

1. A rotary actuator including, a cylinder, a reciprocable piston disposed in said cylinder, said cylinder having internal helical spline teeth, an annular skirt connected to said piston and having internal and external helical spline teeth, a member rotatably journalled in said cylinder having external helical spline teeth, the external helical spline teeth on said skirt mating with the internal spline teeth on said cylinder, the internal helical spline teeth on said skirt mating with the external helical spline teeth on said member whereby rotation will be imparted to said member upon reciprocation of said piston, and an annular element having internal and external helical spline teeth, said annular element having a threaded connection with said skirt and being initially, manually adjustable relative thereto to stagger the relationship between the helical spline teeth on the annular skirt and the annular element and thereby eliminate backlash in the helical spline connections between the cylinder, the skirt, the annular element and the rotatable member.

2. An annular skirt assembly for use with an actuator having an internally helically splined cylinder and an externally helically splined output member, including, a pair of annular elements having internal and external spline teeth engageable with the helically splined output member and the cylinder, said elements having engaging threaded portions whereby said elements are rotatable relative to each other when disengaged from said cylinder and said output member to misalign the spline teeth on said elements, the helix angle of the helical splines on said elements being different than the helix angle of said threaded portions whereby said elements are restrained against relative rotation when assembled with said cylinder and said output member.

3. An annular skirt assembly for use in an actuator having radially spaced, coaxial fixed reaction and rotatable output members, one of said members having internal helical spline teeth and the other of said members having external helical spline teeth, including, a pair of annular elements having internal and external helical spline teeth engageable with the helical spline teeth on said members, said elements having engaging threaded portions whereby said elements can be rotated relative to each other when disengaged from said members, the helix angle of the helical splines being different than the helix angle of said threaded portions whereby said elements are restrained against relative rotation when engaged with said members and the helical spline teeth on said elements can be misaligned to eliminate backlash between said members and said skirt assembly.

4. A rotary actuator including, a cylinder, a reciprocable piston disposed in said cylinder, said cylinder having internal helical spline teeth, an annular skirt connected to said piston and having internal and external helical spline teeth, an output member rotatably journalled in said cylinder having external helical spline teeth, the external helical spline teeth on said skirt mating with the internal helical spline teeth on said cylinder, the internal helical spline teeth on said skirt mating with the external helical spline teeth on said output member whereby rotation will be imparted to said member upon reciprocation of said piston, and an annular element having internal and external helical spline teeth, said annular element having a threaded connection with said skirt, the helix angle of the helical spline teeth being different than the helix angle of said threaded connection, said annular element being initially, manually adjustable relative to said skirt to stagger the relationshsip between the helical spline teeth on the skirt and the element when disassembled from said cylinder and said output member, said element being restrained against movement relative to said skirt when assembled with said cylinder and said output member to eliminate backlash in the helical spline connections between the cylinder, the skirt, the annular element and the output member.

5. The actuator set forth in claim 4 wherein one of said skirt and said element has a reduced diameter externally threaded portion, and the other of said skirt and said element has an internally threaded portion engageable therewith.

6. In combination, a first member having helical spline teeth, a second member capable of rotation relative thereto, a stationary reaction member having helical spline teeth, said second member having internal and external helical spline teeth engaging the helical spline teeth on said first and stationary members, said second member comprising two threadedly interconnected sections, the helix angle of the helical spline teeth being different than the helix angle of said threads whereby said two sections are maintained in fixed assembled relation when the helical spline teeth of said members are engaged, and said two sections are adjustable relative to each other when the helical spline teeth of said members are disengaged to misalign the helical spline teeth on said sections to eliminate backlash in the helical spline connections between the two members.

7. A rotary actuator including, a cylinder, a reciprocable piston disposed in said cylinder, said cylinder having internal helical spline teeth, an annular skirt connected to said piston and having internal and external helical spline teeth, an output member rotatably journalled in said cylinder having external helical spline teeth, the external helical spline teeth on said skirt mating with the internal spline teeth on said cylinder, the internal helical spline teeth on said skirt mating with the external helical spline teeth on said member whereby rotation will be imparted to said member upon reciprocation of said piston, and an annular element having internal and external helical spline teeth, said annular element being operatively connected with said skirt so as to be adjustable relative to said skirt to stagger the relationship between the helical spline teeth on the skirt and the element when disassembled from said cylinder and said output member, said element being automatically restrained against movement relative to said skirt when assembled with said cylinder and said output member to eliminate backlash in the helical spline connections between the cylinder, the skirt, the annular element and the output member.

8. An annular skirt assembly for use in an actuator having radially spaced, coaxial fixed reaction and rotatable output members, one of said members having internal helical spline teeth and the other of said members having external helical spline teeth, including, a pair of annular elements having internal and external helical spline teeth engageable with the helical spline teeth on said members, said elements being operatively connected whereby said elements can be adjusted relative to each other to misalign the helical spline teeth on said elements when said elements are disengaged from said members, the operative connection between said elements automatically restraining relative movement between said elements when the helical spline teeth on said elements are engaged with the helical spline teeth on said members.

9. In combination, a first member having helical spline teeth, a second member capable of rotation relative thereto, a stationary reaction member having helical spline teeth, said second member having internal and external helical spline teeth engaging the helical spline teeth on said first and stationary members, said second member comprising two operatively connected sections, said sections being adjustable relative to each other when the helical spline teeth of said members are disengaged to misalign the helical spline teeth on said sections, the operative connection between said two sections automatically precluding relative movement between said sections when the helical spline teeth of said members are engaged.

References Cited in the file of this patent

UNITED STATES PATENTS

| | | |
|---|---|---|
| 109,348 | Graham | Nov. 15, 1870 |
| 253,266 | Darling | Feb. 7, 1882 |
| 697,332 | Doney | Apr. 8, 1902 |
| 1,256,471 | Genero | Feb. 12, 1918 |
| 1,707,442 | Maag | Apr. 2, 1929 |
| 1,718,469 | Maag | June 25, 1929 |
| 2,791,128 | Geyer et al. | May 7, 1957 |